(12) United States Patent
Vedder et al.

(10) Patent No.: US 6,561,432 B1
(45) Date of Patent: May 13, 2003

(54) PORTABLE DATA SUPPORT WITH A BREAK-OFF MINI-CHIP CARD

(75) Inventors: Klaus Vedder, Garching (DE); Renee-Lucia Barak, Unterhaching (DE)

(73) Assignee: Giesecke & Devrient GmbH (DE)

( * ) Notice: Subject to any disclaimer, the term of this patent is extended or adjusted under 35 U.S.C. 154(b) by 0 days.

(21) Appl. No.: 09/869,289

(22) PCT Filed: Jan. 18, 2000

(86) PCT No.: PCT/EP00/00366
§ 371 (c)(1),
(2), (4) Date: Oct. 11, 2001

(87) PCT Pub. No.: WO00/43950
PCT Pub. Date: Jul. 27, 2000

(30) Foreign Application Priority Data

Jan. 19, 1999 (DE) .......................... 199 01 965

(51) Int. Cl.$^7$ ............................................... G06K 19/06
(52) U.S. Cl. .................. 235/492; 235/487; 235/380
(58) Field of Search ................ 235/487, 492, 235/493, 380, 382, 383

(56) References Cited

U.S. PATENT DOCUMENTS

| | | | | |
|---|---|---|---|---|
| 5,362,955 A | * | 11/1994 | Haghiri-Tehrani | 235/492 |
| 5,531,145 A | * | 7/1996 | Haghiri-Tehrani | 83/27 |
| 5,677,524 A | * | 10/1997 | Haghiri-Tehrani | 235/487 |
| 5,780,837 A | * | 7/1998 | Garcia | 235/487 |
| 5,936,227 A | * | 8/1999 | Truggelmann et al. | 235/487 |
| 6,065,681 A | * | 5/2000 | Trueggelmann | 235/487 |

FOREIGN PATENT DOCUMENTS

| | | | | |
|---|---|---|---|---|
| DE | 3804361 C1 | * | 9/1988 | |
| DE | 29801508 U1 | * | 4/1998 | ........... B42D/15/10 |
| DE | 29819389 U1 | * | 1/1999 | ......... G06K/19/077 |
| DE | 19817297 A1 | * | 10/1999 | ........... G06K/17/00 |
| DE | 10012055 A1 | * | 9/2000 | ........... B42D/15/10 |
| DE | 19926348 A1 | * | 12/2000 | ......... G06K/19/077 |
| EP | 453737 A1 | * | 10/1991 | ........... G01R/1/073 |
| EP | 535436 A2 | * | 4/1993 | ........... B42D/15/02 |
| WO | WO 9731334 A1 | * | 8/1997 | ......... G06K/19/077 |
| WO | WO 200016257 A1 | * | 3/2000 | ........... B42D/15/10 |
| WO | WO 200049567 A1 | * | 8/2000 | ......... G06K/19/077 |
| WO | WO 200073988 A1 | * | 12/2000 | ........... B42D/15/10 |
| WO | WO 200073989 A1 | * | 12/2000 | ........... G06K/17/00 |
| WO | WO 2002054345 A1 | * | 11/2002 | |

* cited by examiner

Primary Examiner—Karl D. Frech
Assistant Examiner—Uyen-Chau Le
(74) Attorney, Agent, or Firm—Bacon & Thomas, PLLC

(57) ABSTRACT

A portable data carrier with a break-out mini smart card embedded therein. The mini smart card is separated from the remaining card body by a free punch extending over substantial parts of the mini smart card. According to the invention, another rated breaking line is provided within the mini smart card, preferably consisting of a perforated line and permitting further reduction in size of the mini smart card.

8 Claims, 1 Drawing Sheet

PORTABLE DATA SUPPORT WITH A BREAK-OFF MINI-CHIP CARD

BACKGROUND OF THE INVENTION

The present invention relates to a portable data carrier with a break-out mini smart card according to the preamble of claim 1.

In known mobile radio systems, for example a GSM mobile radio system, the SIM (subscriber identity module) can be present in two different card formats. Mobile phones intending frequent change of the SIM usually employ the ID-1 card format since the large card simplifies handling during a change. For mobile phones intending a change of SIM only rarely or not at all, or for very small mobile phones, the so-called plug-in SIM in the ID-000 format has become established. In order to make it easier to provide substantially prepersonalized smart cards for mobile radio use, smart cards for mobile radio use are normally provided with a punching permitting the plug-in (mini smart card) to be broken out without much trouble.

From the German print DE-A 40 07 221 or the European print EP-A 0 535 436 it is known to dispose a mini smart card in the ID-000 format in a card with the standard ID-1 format the mini smart card be being surrounded by a punching, i.e. a free punch, with only one or more bars being retained to hold the mini smart card in the card body.

European patent application EP-A 0 495 216 furthermore discloses an ID card with a microprocessor, the microprocessor with its contact surfaces being disposed on a standard smart card (ID-1 format) at the place fixed by the standard. The microprocessor and its contact surfaces are surrounded on three sides by a free punch in the form of a plug-in (mini smart card in the ID-000 format) while the fourth side of the carrier has hinge-like notching.

This makes it possible for the standard card to be used with the plug-in not broken out in mobile radio devices which intend frequent change of the SIM, while the break-out plug-in is used as a "mini smart card" in smaller mobile radio devices or devices usually not intending a change of SIM.

With increasing miniaturization of mobile radio devices, however, the problem arises that even the mini smart card in the ID-000 format is still too large.

SUMMARY OF THE INVENTION

It is therefore the problem of the invention to provide a smart card with a plug-in which permits further reduction in size of the mini smart card, all card formats be being reliably separable from each other or it being readily possible to remove the plug-in from the remaining card body, while at the same time plug-in and card body form a stable unit in case the plug-in stays in the remaining card body.

This problem is solved starting out from the features of the preamble of claim 1 by the characterizing features of claim 1.

Advantageous embodiments of the invention are stated in the dependent claims. The basic idea of the invention is that the plug-in in the ID-000 format contains a rated breaking point which permits further miniaturization of the mini smart card by removal of part of the plug-in. This additional rated breaking line can be realized by notching, a free punch with bars, etc.

Said rated breaking line is realized in advantageous fashion by a perforation. Perforation constitutes a more stable connection than notching so that the plug-in in the ID-000 format can be broken out of the card in the ID-1 format without breakage of the rated breaking line for further miniaturization.

BRIEF DESCRIPTION OF THE DRAWINGS

In the following the invention will be explained in more detail with reference to FIGS. 1 to 2, in which:

FIG. 1 shows a card with a rated breaking line in the plug-in,

DETAILED DESCRIPTION OF THE INVENTION

Figure 1:
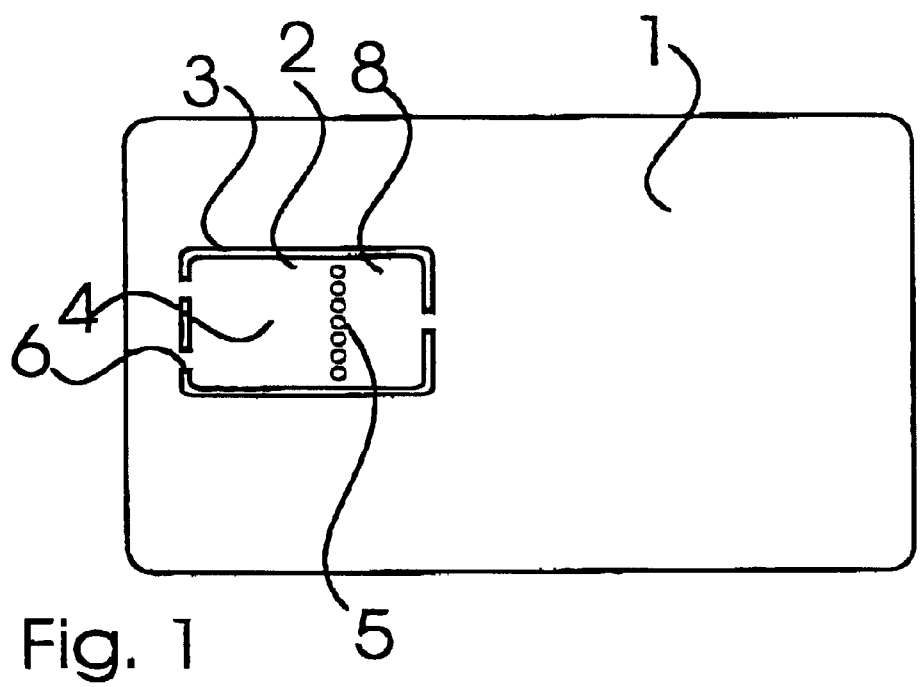

FIG. 1 shows card body 1 with plug-in 2 containing an integrated circuit and contact surface 4. The contour of plug-in 2 is defined by free punch or punching 3 within remaining card body 1 and connected therewith only by one or more bars 6. Bars 6 are designed so as to permit plug-in 2 to be easily broken out of card body 1. Within the plug-in there is furthermore a rated breaking line in the form of perforated line 5 which allows further reduction in size of the plug-in by breaking off remaining piece 8. Perforation 5 constitutes a more stable connection than connecting bars 6 so that perforation 5 does not break when plug-in 2 in the ID-000 format is broken out of card body 1. After the plug-in is broken out, a further reduction in size of the mini smart card can be obtained by bending on perforated line 5.

Figure 2:
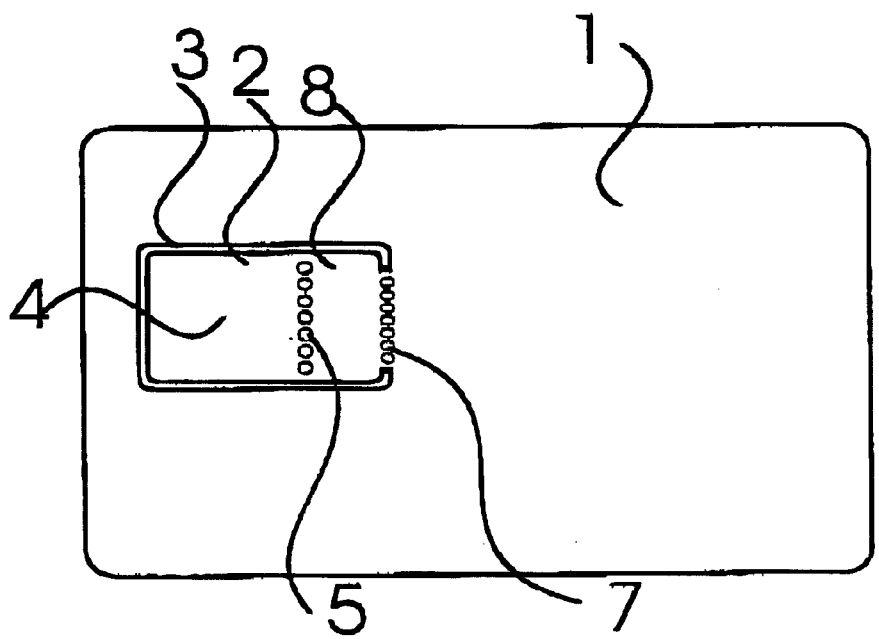
FIG. 2 shows a card with two rated breaking lines for plug-ins of different sizes.

FIG. 2 shows a smart card similar to FIG. 1 whereby plug-in 2 in the ID-000 format is separated from remaining card body 1 on three sides by free punch 3 and a connection with the remaining card body exists on the fourth side only by means of perforated line 7. Perforation 7 has smaller perforation holes and a lesser distance between the holes so that perforated 1 line 7 breaks before perforated line 5 when − pressure is exerted on the plug-in.

The size and density of perforations 7 is dependent on the desired stability of the completed card. Advantageously, free punch 3 extends around the corners of the fourth side and perforation 7 yields a straight line in order to make it easier to break out mini smart card 2.

This connection of plug-in 2 with remaining card body 1 has higher stability compared to the prior art. When slight pressure is exerted on plug-in 2 this does not lead to a change of position of the plug-in with respect to the surface of remaining card body 1 since the connection with card body 1 exists throughout the thickness of the card body. Nevertheless, perforations 7 produce a rated breaking line which causes the plug-in to break out upon firmer pressure. The inventive solution leads substantially to two stable states. In the first the plug-in is disposed in a firm position with respect to the remaining card body, while in the second the plug-in is broken out.

What is claimed is:

1. A portable data carrier (1) comprising a break-out mini smart card (2), the mini smart card (2) being largely separated from the remaining card body by a free punch (3) surrounding most of the mini smart card, wherein a rated breaking line (5) is disposed within the mini smart card (2) for further reducing the size of the mini smart card (2).

2. A portable data carrier according to claim 1, wherein the free punch (3) extends over three sides of the mini smart card and a fourth side has a perforation (7).

3. A portable data carrier according to claim 2, wherein the free punch (3) extends around the corners of the fourth side and the perforation (7) extends along a straight line.

4. A portable data carrier according to any of claim 1 to 3, wherein the rated breaking line (5) is formed by a perforated line.

5. A portable data carrier according to claim 2 or 3, wherein the rated breaking line (5) has higher strength than the perforation (7).

6. A portable data carrier according to claim 2 or 3, wherein the mini smart card is connected with the remaining card body by at least one bar disposed on the side opposite the perforation (5).

7. A portable data carrier according to claim 2 or 3, wherein the rated breaking line (5) is formed by a perforated line that has a higher strength than the perforation (7).

8. A portable data carrier according to claim 7, wherein the mini smart card is connected with the remaining card body by at least one bar disposed on the side opposite the perforation (5).

* * * * *